United States Patent [19]

Caringer

[11] Patent Number: 4,595,618
[45] Date of Patent: Jun. 17, 1986

[54] VEHICLE SEAT BELT ACCESSORY

[76] Inventor: Ronald L. Caringer, 448 Green Valley Dr., Chandler, Ind. 47610

[21] Appl. No.: 628,645

[22] Filed: Jul. 6, 1984

[51] Int. Cl.$^4$ .............................................. A41F 9/00
[52] U.S. Cl. ................................ 428/100; 2/DIG. 6; 446/28
[58] Field of Search .................. 428/100, 16; 362/108; 446/28; 2/DIG. 6

[56] References Cited

U.S. PATENT DOCUMENTS

| | | | |
|---|---|---|---|
| 2,593,218 | 4/1952 | Swain | 446/28 X |
| 2,686,313 | 8/1954 | Seidler | 2/75 X |
| 3,184,883 | 5/1965 | McCook | 446/28 |
| 3,241,881 | 3/1966 | Carnahan et al. | 2/DIG. 6 |
| 3,426,363 | 2/1969 | Girard | 428/100 X |
| 3,529,865 | 9/1970 | Atwell | 428/181 X |
| 3,789,547 | 2/1974 | Chemarin | 428/100 X |
| 3,890,723 | 6/1975 | Haurat et al. | 434/267 |
| 3,999,521 | 12/1976 | Puiello | 428/100 X |
| 4,018,960 | 4/1977 | Berger et al. | 428/192 X |
| 4,089,068 | 5/1978 | Swallow | 2/DIG. 6 |
| 4,112,482 | 9/1978 | Powell | 362/108 |
| 4,118,812 | 10/1978 | Pangburn | 5/433 |
| 4,543,278 | 9/1985 | Ackerman | 428/100 X |

FOREIGN PATENT DOCUMENTS 1430513  3/1976  United Kingdom ............... 428/100

OTHER PUBLICATIONS

Dritz "Velcro" Tape Fasteners Article, Jan. 10, 1972.

Primary Examiner—Henry F. Epstein
Attorney, Agent, or Firm—Warren D. Flackbert

[57] ABSTRACT

An accessory used in combination with a vehicle seat belt characterized as a novelty item, such as a stuffed teddy bear or the like, secured to a sleeve through which the seat belt is selectively introduced. The arrangement serves entertainment and, importantly, safety purposes for a child user, with the belt, when secured for use, presenting the novelty item in a displayed and/or lap held position. In another assembly procedure, the sleeve could be slit along its length for placement after the seat belt is in a use condition.

1 Claim, 3 Drawing Figures

VEHICLE SEAT BELT ACCESSORY

As is known, the usage of vehicle seat belts for increased passenger safety is widespread and urged by various safety and regulatory bodies. The need is especially great in the instance of child safety, either in connection with the seat belt commonly furnished by the vehicle manufacturer or, for the young, the seat belts employed with independent and/or removable seats. In any event, it has been considered that a more positive approach should be presented for inducing seat belt usage by children and, accordingly, such is a primary objective of the invention. Basically, therefore, the invention provides an accessory adaptable to an existing vehicle seat belt which affords both safety and entertainment value in connection with seat belt usage by the young.

More specifically, the invention presents an accessory for a vehicle seat belt, being in the form of a novelty item, such as a stuffed teddy bear, a stuffed comic strip character, or the like, secured to a sleeve through which the seat belt is drawn. In use, the decorative accessory lies in the lap of the young user, achieving, basically, the desired ultimate safety effect and, as well, an entertainment value. In other words, the youngster finds usage of the vehicle seat safety belt more desirable through the induced entertainment factor afforded by the accessory presented herein.

As stated, the instant vehicle seat belt accessory is readily positioned on an existing seat belt by introducing the latter within a sleeve secured to the rear surface of (or even through) the accessory, but, in the alternative, the accessory may include alternative means for the placement of such on the seat belt after seat belt securement. In this latter connection, the sleeve may be slitted along one edge and joined through loop-pile segments, such as commercially available Velcro through the use of snaps or a slide fastener; or, perhaps, through the overlying of portions of the sleeve.

BRIEF DESCRIPTION OF THE DRAWINGS

In any event, a better understanding of the present invention will become more apparent from the following description, taken in conjunction with the accompanying drawing, wherein.

Figure 1:
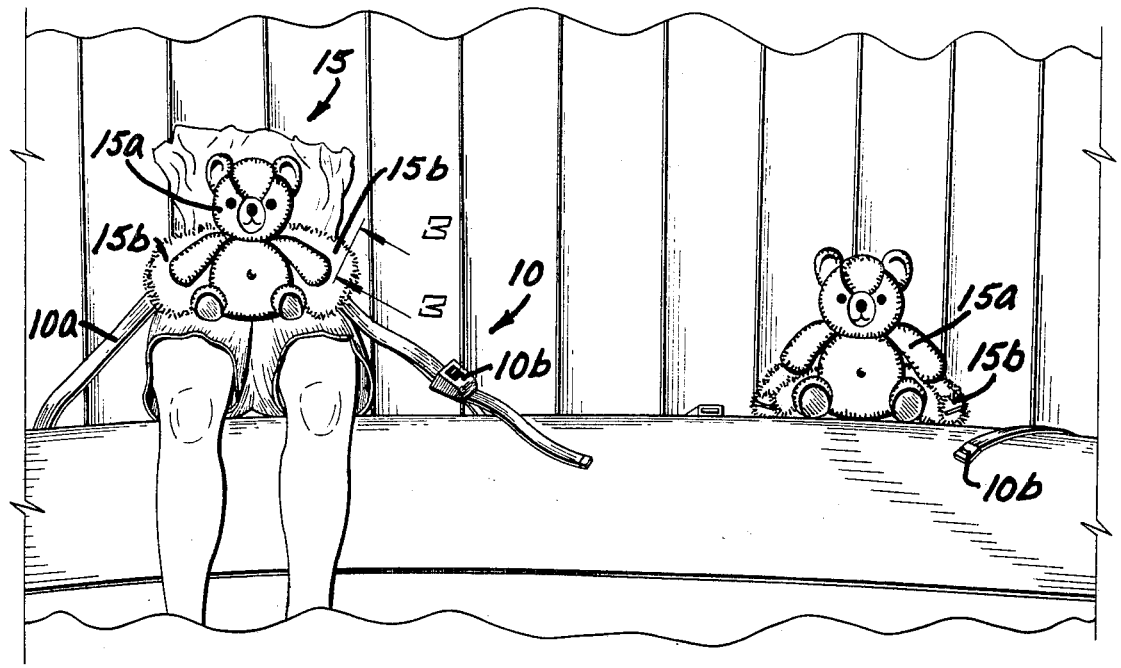
FIG. 1 is a view in front elevation showing a vehicle seat belt accessory in accordance with the teachings of the present invention, where the accessory is shown in a use position and in a position prior to use.

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
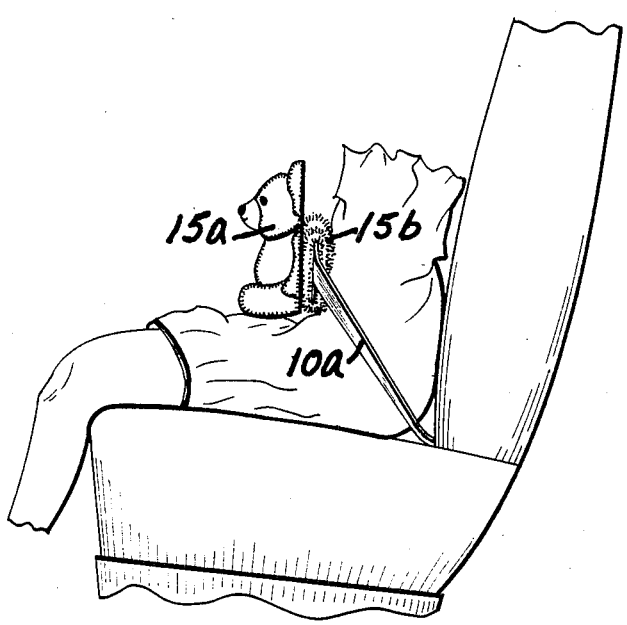
FIG. 2 is a view in side elevation, detailing the securement of the accessory at a use position; and, FIG. 3 is a view in side elevation, taken at line 3—3 on FIG. 1 and looking in the direction of the arrows, detailing one approach for the selective securement of the accessory in the use position.

Referring now to the figures, and particularly to FIGS. 1 and 2, the vehicle safety belt accessory of the invention is shown, for simplicity in presentation, in connection with a typical seat belt installation in the rear seat of an automobile. As known, each seat belt assembly 10 is defined by a selectively extendable and/or retractable belt portion 10a which extends through and is secured by a fastening or locking mechanism 10b (also selective in use). The belt portion 10a is conventionally made from flexible material, being of such length so as to extend around the lower torso region of the user.

While accessory 15 herein is representatively shown in the form of a stuffed teddy bear 15a, other forms of novelty items are equally adaptable for use, such as a stuffed comic strip character, or, as a matter of fact, any "cuddly" item found endearing to youngsters. In any event, the accessory 15 includes a sleeve 15b affixed to the rear surface thereof and extending somewhat beyond the sides of the novelty item 15a, where such sleeve 15b receives the belt portion 10a of the seat belt assembly 10.

In use, the novelty item 15a, carried by accessory 15 defining the invention, is maintained in position upon the fastening of the seat belt assembly 10, presenting entertainment value to the young user, i.e. simulates a lap held position for the teddy bear 15a, while, at the same time, and importantly, affords the desired protective safety feature.

In other words, children would look forward to seat belt placement because, when fastened, the novelty item 15a provides the entertainment (and comforting aspects) of a teddy bear, for example, but still becomes part of the positive seated pattern, i.e. promotes, in combination, both the desired safety aspect and an entertainment value.

Figure 3:
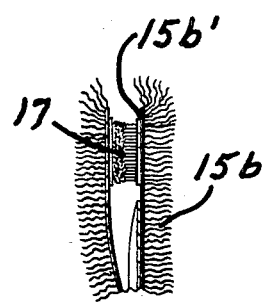

While the belt portion 10a can be, as described, introduced or extend through the sleeve 15b, other accessory holding and/or positioning arrangements may be employed. In this connection, and as evident in FIG. 3, the top edge 15b' of the sleeve 15b could be slit or open along its length so that placement of the accessory 15 can be achieved after the seat belt assembly 10 has been positioned. In order to then retain or fasten the sleeve 15b in position, loop-pile segments 17, such as Velcro, could be employed. In this connection, and as alternatives, selective placement of the accessory 15 on the fastened seat belt assembly 10 could also be achieved, for example, by a slide fastener, snaps, or through an overlying relationship of portions of the sleeve 15b.

From the preceding, it should be evident that the invention affords a positive and yet entertaining approach for inducing desired vehicle safety seat belt usage by children, the latter being accomplished through the combination of a novelty item, endearing to the child, with a customary seat belt assembly. The accessory described herein is, of course, susceptible to various changes within the spirit of the invention as, for example, the sleeve can extend further from the accessory in lateral directions; proportioning may be altered; single plane characters or novelty items, in contrast to stuffed characters or novelty items, might be utilized; the postion of the slit along the sleeve modified; and, the like. Thus, the preceding should be considered illustrative and not as limiting the scope of the following claims.

I claim:

1. A child safety device for vehicular usage comprising the combination of a vehicle safety seat belt and an entertainment device, where said vehicle safety seat belt overlies the person of the child in a seated position and where said entertainment device is releasably positioned on said vehicle safety seat belt in the lap region of said child by a sleeve which is an integral part of said entertainment device and can be placed around said vehicle safety seat belt after in use condition.

* * * * *